(12) United States Patent
Weber

(10) Patent No.: US 7,193,691 B2
(45) Date of Patent: Mar. 20, 2007

(54) ACTIVE SENSOR RECEIVER DETECTOR ARRAY FOR COUNTERMEASURING SHOULDER-FIRED MISSILES

(75) Inventor: Jonathan L. Weber, Nashua, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/529,982

(22) PCT Filed: Nov. 17, 2003

(86) PCT No.: PCT/US03/37042

§ 371 (c)(1), (2), (4) Date: Mar. 31, 2005

(87) PCT Pub. No.: WO2004/046750

PCT Pub. Date: Jun. 3, 2004

(65) Prior Publication Data

US 2006/0000987 A1 Jan. 5, 2006

(51) Int. Cl.
*G01C 3/08* (2006.01)
(52) U.S. Cl. .................. 356/5.01; 356/5.1; 356/4.1
(58) Field of Classification Search ............. 356/5.01
See application file for complete search history.

(56) References Cited

U.S. PATENT DOCUMENTS

| | | | | |
|---|---|---|---|---|
| 4,651,332 A | * | 3/1987 | Brown | 377/20 |
| 4,659,429 A | | 4/1987 | Isaacson et al. | 156/644 |
| 5,900,833 A | * | 5/1999 | Sunlin et al. | 342/22 |
| 5,973,316 A | | 10/1999 | Ebbesen et al. | 250/216 |
| 6,137,566 A | * | 10/2000 | Leonard et al. | 356/141.1 |
| 6,171,730 B1 | | 1/2001 | Kuroda et al. | 430/5 |
| 6,304,527 B1 | | 10/2001 | Ito et al. | 369/44.23 |
| 6,392,747 B1 | * | 5/2002 | Allen et al. | 356/141.1 |
| 2002/0031299 A1 | | 3/2002 | Hatakoshi | 385/31 |

FOREIGN PATENT DOCUMENTS

JP     8-179493     7/1996

OTHER PUBLICATIONS

International Search Report mailed Mar. 23, 3005, Issued In International Application No. PCT/JP2004/014445.
Written Opinion mailed Mar. 23, 2005, issued in International Application No. PCT/JP2004/014445.
Chen, Fang, et al., "A Study of Near-field Aperture Geometry Effects on Very Small Aperture Lasers (VSAL)," Proceedings of the SPIE—The International Society For Optical Engineering, vol. 5069, No. 1, Sep. 16, 2003, pp. 312-318.

* cited by examiner

*Primary Examiner*—Thomas H. Tarcza
*Assistant Examiner*—Luke D. Ratcliffe
(74) *Attorney, Agent, or Firm*—Robert K. Tendler; Daniel J. Long

(57) ABSTRACT

A focal plane architecture is provided which includes direct reading of an array of infrared detectors, each coupled to its own threshold circuit, the output of which is coupled to one input of a NAND gate, with the other input to the NAND gate being provided with a delayed threshold circuit output, thus to permit discrimination against ground clutter. This architecture results in an ultra fast frame read out, inherent discrimination of compact targets, photon counting at infrared wavelengths, and programmable range gating by exterior selection of array events within an expected return time for a transmitted pulse.

8 Claims, 9 Drawing Sheets

ACTIVE SENSOR RECEIVER DETECTOR ARRAY FOR COUNTERMEASURING SHOULDER-FIRED MISSILES

STATEMENT OF GOVERNMENT INTEREST

The invention described herein was made under Contract No. F33615-02-D-1178 with the Government of the United States of America and may be manufactured and used by and for the Government of the United States of America for Governmental purposes without the payment of any royalties thereon or therefore.

FIELD OF THE INVENTION

This invention relates to the detection and countermeasuring of missiles and more particularly to methods and apparatus for improved detection of LIDAR returns.

BACKGROUND OF THE INVENTION

LIDAR Countermeasure Systems

The detection and countermeasuring of shoulder-fired missiles, primarily aimed at aircraft, requires that the missile be detected early enough so that it can be countermeasured, usually by spoofing the missile through irradiating its detector with jamming or other signals to cause the missile to go off target. Today there are two types of countermeasure systems in use for protection. The first is a preemptive lamp jammer which operates whenever the operators believe they may be in danger. The second is reactive triggered by a missile launch detection system and usually responding by dispensing a pyrotechnic flare.

Lamp jammers are usually limited to small aircraft because they have to produce a wide beam which has be much brighter than the hot engine signature. Such devices have not been successful enough to have been widely adopted.

Reactive systems have been plagued by false alarms, hazards of pyrotechnics near busy airports, and the increasing ability of threat missiles to reject flares.

In response to this, directed infrared countermeasures (DIRCM) systems have been in development. These can use passive or active search. Passive search reacts to missile launches and then directs a relatively narrow beam at the threat. The effectiveness depends on detection of the threat in time to get a defeat it via the countermeasure beam. These systems cause the threat missile to miss the host and may cause the missile to lose guidance. There remains the hazard that a diverted missile could retarget on another landing or taking off aircraft in addition to the usual hazards with several pounds of metal filled with burning rocket fuel in uncontrolled flight around an airport.

The benefit of active search is that it can find a missile either before launch or every soon after. Early detection improves the defeat probability and preventing launch eliminates the hazards of a missile flying about crowded air space. Prompt countermeasure immediately upon launch has a high probability of putting the missile on the ground.

One of the problems with such an active system is that the scanning or search laser is in the kilowatt range, with the high power, originally thought to be necessary to find the missile's detector because of the large area the laser would have to illuminate to find it promptly. Utilizing such costly and high-power lasers for scanning in which the laser is always turned on, is both power consumptive and itself forms a heat source onto which heat-seeking detectors can home, called beaconing. The result is that it would be highly desirable to be able to provide a system in which milliwatt lasers could be utilized, both because of their decreased cost and because of their decreased power, which does not provide a large beaconing signal or thermal signature on which the incoming signal can home. Moreover, lower power permits better eye-safe operation, important when the laser is used near populated areas.

Thus, in the past, active systems have been provided which actively shine a laser into the hostile system and look for what is called an augmented return, due to the fact that the incoming beam is concentrated back in the direction of the laser that is illuminating it. These augmented returns are due to the detection system utilized in the missiles, which include reticles utilized in missile seekers or TV tracker cameras. Thus, the same optics that are utilized to focus the infrared radiation from an aircraft target are focusing the return beam back towards the aircraft.

Even so, strong returns from the missile occur very, very rarely for two reasons. The first is that missile seekers are typically scanning devices so that the time that a return signal comes back to the interrogating laser would only be the time when the scanning device is directly aimed at the particular aircraft target. Secondly, shoulder-launched missiles are basically hand-held devices so that hand tremors cause the boresight of the seeker to move around. This keeps a strong return from coming back to the interrogating laser much of the time. Thirdly, one rarely sees the high-intensity returns due to air turbulence, which is moving the interrogating light away from the missile's seeker. Thus, even if the seeker is directed at the target, there is nonetheless a 10,000-to-1 variation in the amount of return that one obtains just by virtue of the return coming through the air. As a result, the odds of obtaining a fully augmented, high return from the seeker are very, very low, regardless of the use of high-power lasers.

It is therefore required to be able to have a system that can find a low return from the sensor on the missile and discriminate it against ground returns. Note that the ratio of missile to ground return does not depend on laser power. Thus a "brute strength" approach will fail because the ratio remains the same regardless of laser power.

It will be noted that, in the search mode, very powerful lasers are utilized against systems with high cross-sections. However, such attempts have not succeeded because of ground returns and because the LIDAR system is not receiving enough of a return from the missile's seeker.

Moreover, if one wants to reduce the effect of ground clutter, one can go to shorter and shorter pulses and finer and finer returns. However, to cover a large area, a large array of detectors are utilized which have integrators to sum up the returns over a long period of time. However, the long summation period results in the adding up of the smaller pulses from grains of sand and rocks in front of and behind the target. Thus, one needs a way of gating out the returns from terrain surrounding the actual target.

In a conventional array, one uses a snapshot mode or an electro-optical system with a photo cathode to do range gating. The problem with range gating is that one can only get one range per frame so that one has the choice of not seeing most of the scene or making the gate so long that it is incapable of discriminating. Range gating is effective if one knows the range, but if one knows the range there is no need for the sensor.

More particularly, when one illuminates an area with short pulses, the short pulse will come back the same length from the target but it will be stretched when it comes back from the ground because the ground footprint is very long and because one only obtains a small return from each part of the ground footprint. A conventional detector will not discriminate the ground because it adds up the small returns as it integrates. Thus, in effect, one needs a detector that can gate out the longer returns and look for the short return in such a way that it is not shutting out all of the other elements in the array which may get returns either closer in or further away from the missile's seeker.

In order to overcome the problem of having to discriminate targets versus ground clutter, and in order to be able to discriminate by utilizing ultra-short pulses so as to be able to range gate out ground clutter, one requires a detector array which can be read out at an exceptionally high rate. For the discrimination required, the scanning laser pulses need to be on the order of one nanosecond in length and the detector's array needs to have all pixels read out simultaneously. Note that in the array of 500 by 500 pixels, a quarter of a million pixels need to be read out all at one time.

It will be appreciated that a kilowatt of output power requires 20 kilowatts of pump power, which in turn requires about 30 kilowatts of pump power. This effectively makes the aircraft hot and thus a bigger target for missiles. Thus, what is required is an active search system that eliminates the need for high-power lasers. In order to do this one needs an eye-safe milliwatt searching laser with nanosecond pulse lengths and the ability to read out all the detectors of the array simultaneously or at least with a combined response and reset latency less than a couple of nanoseconds.

One also needs a system that can detect the shoulder-fired missile quickly, ideally while the missile is still in its launcher because one only has seconds between the launch of the missile and its detonation at an aircraft. Current countermeasure systems are time pressed to get the response to the missile in time to divert it. An active system has the potential to detect a missile before launch, to jam it to prevent launch, potentially disincentivising the terrorist.

A low wattage, below 10 watts, laser is desirable not only because of the lack of heat signature that is associated with the low power, but also because of the eye-safe requirement (ten Watt lasers in the desired bands are eyesafe at about ten meters). If such a system is flown on a commercial aircraft, or indeed on any aircraft, it is important that the search laser that is always on, be an eye-safe laser and be one with a reduced output. Even if high-power lasers operate in the eye-safe range, eventually the high power will damage the human eye, regardless of the wavelength of the laser radiation. If all commercial aircraft are to be provided with active countermeasure systems, then it is important that the search lasers utilized have output eye-safe laser at a few meters range from the transmitters so as to minimize damage to the human eye.

It will be appreciated that once the missile has been detected by the active search system, then the missile can be countermeasured through the use of another laser, which may in fact be high-powered. However, since this other laser is not on but for a small portion of the time, solving the search laser problem is more important.

It will be appreciated that planes are most vulnerable when they take off or land, but can be attacked over a long range during approach and climb out. While ten-watt search lasers may be utilized in approach and climb out, sub-watt lasers are desirable for aircraft taking off, landing, and taxiing, mostly because the ranges are short in these scenarios and short eyesafe range becomes important while the aircraft is on the tarmac. In a classical two-way system, one requires the amount of laser power needed to go up with range to the sixth power. Thus, every time one doubles the range, one is multiplying the power needed by $2^6$ or a factor of 64. If one has to protect oneself out to, for instance, ten kilometers, one would potentially need 100 times more power than that which would be needed to protect an aircraft out to only three or four kilometers, the takeoff and landing scenario.

Detector Arrays

By way of further background, multiplexed integration has been the standard for large arrays of detectors. Each pixel comprises a detector, a charge integrating amplifier and a gate to a multiplexer readout circuit. This architecture is essential to read out the signal levels on each pixel and is used because a typical array may have tens of thousands or even millions of pixels. Moreover, this architecture is used because the array must be read via a limited number of interconnects. The frame time is largely set by the time required to transfer data from each storage site. This can be improved by about a factor of 10 to 100 reading only a subset of pixels. Temporal resolution can thus be improved by such "snapshotting." This mode is typically capable of reducing array "on time" to a few microseconds. However, all the pixels of interest must still be read via the multiplexer before another set of data can be acquired unless superposition of events is acceptable.

This microsecond snapshot time means that range gates have to be at least a few light microseconds or several hundred meters. This is too large to control noise and background returns. Furthermore, the need to read an entire frame means that search energy pulses can only be transmitted at slow frame rates if range information is to be useful.

Note also that even the few microsecond "gate" times available by snapshotting allow considerable dark signal to accumulate, producing a high noise level. Moreover, the use of snapshotting and sub frame collection to increase frame rate still does not enable the array to collect more than one range bin per read cycle. This limitation imposes millisecond and longer delays between range samples and forces large range bins and high noise.

Previous attempts to reduce receiver noise have included on-pixel gain. On-pixel amplification by photo avalanching has improved dramatically recently but is limited by quantum tunneling to levels too low to offset the noise levels of conventional readout devices. On chip gain amplifies signal, background and dark current. Full benefit of this improvement relies on minimizing the sample time reducing ground returns and the time for dark current to accumulate.

SUMMARY OF THE INVENTION

The present invention is a new method of constructing a focal plane array that makes it a direct reading array in which all pixels are effectively read out simultaneously. This allows the use of nanosecond search laser pulses which permits discrimination against ground returns. It also permits going from kilowatt search lasers to milliwatt search lasers. Note that the subject direct reading array replaces the integrating pixel amplifier with a threshold sensor that is set to a sufficiently high signal-to-noise ratio such that accidental events are rare. Because of the high threshold set for each detector, for each frame it is very unlikely that more than one pixel group will fire per frame which leads to the direct reading result. Hence once the event-indicating pixel group is read all the data in a frame is captured because the others are at zero.

By rare one means that less than one event occurs in the entire pixel set per sample time. Since the sample times can be set in the 0.1 to 10 nanosecond range utilizing the subject technique in which no integration is used, one can use nanosecond pulse milliwatt eye-safe lasers to be able to distinguish a return from a missile seeker from the rest of the terrain.

In the subject invention, the reduction in search laser power made possible by the subject direct reading array comes from use of short pulses to reduce noise and from the ability to use high probability values as opposed to peak return values. The high probability values are lower than the less frequent peak values but not low enough to offset the number of trials needed to reliably obtain them.

In order to discriminate ground scatter, in one embodiment a NAND gate is used having one input coupled to the output of the threshold detector, with its other input coupled to a one-nanosecond delayed threshold output. As a result, if the return is from ground clutter it will be present for longer than one nanosecond and there will be no output from the NAND gate, thus discriminating against ground returns.

Note that typical design rules specify that there is expected to be less than one target in over a hundred frames. This enables the pixel detector to directly access row and column registers all at once to signal detection of an event. This direct readout works because only one event is likely to occur at a time on the entire array for any given frame. Thus, instead of reading all the pixels, which takes a considerable amount of time, the entire frame content is read out instantaneously with an event determined by which registers have signaled an event. All other pixels have a logical zero. Thus each detector functions as a one-bit analog-to-digital converter.

This embodiment of an array detector is consistent with search radars which commonly do not keep intensity information once they have a detection event to process. The advantages are that the array can be completely read in a very brief time limited only by the bandwidth of the on-pixel threshold detection comparator and address register. This enables elimination of snapshotting in favor of direct event detection at short enough intervals to reduce dark current noise to minimal levels. Reduced frame time also enables operation at near "photon counting" levels with achievable on-pixel gain and dark current levels. Finally, the direct reading technique permits improved range gating that discriminates against extended-length returns from ground clutter. The subject direct readout with readily settable thresholds is also better than using Geiger counter techniques in which physical breakdown is used. The physical breakdown is difficult to use with pulse width discrimination and is not quick because of latencies in the physical process.

As a result, the subject invention includes replacement of an integrating amplifier with a one-bit analog-to-digital converter functioning as a comparator threshold circuit. Each threshold detector is directly accessed and outputs to address registers. The use of the parallel readout detector scheme results in near "photon counting" performance with gains achievable on MWIR (3–5 micron) LWIR (8–9 micron) devices and Visible NIR devices without use of high voltage vacuum tube technology.

In summary, a focal plane architecture is provided which includes direct reading of an array of infrared detectors, each coupled to its own threshold circuit, the output of which is coupled to one input of a NAND gate, with the other input to the NAND gate being provided with a delayed threshold circuit output, thus to permit discrimination against ground clutter. This architecture results in an ultra fast frame read out, inherent discrimination of compact targets, photon counting at infrared wavelengths, and programmable range gating by exterior selection of array events within an expected return time for a transmitted pulse.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
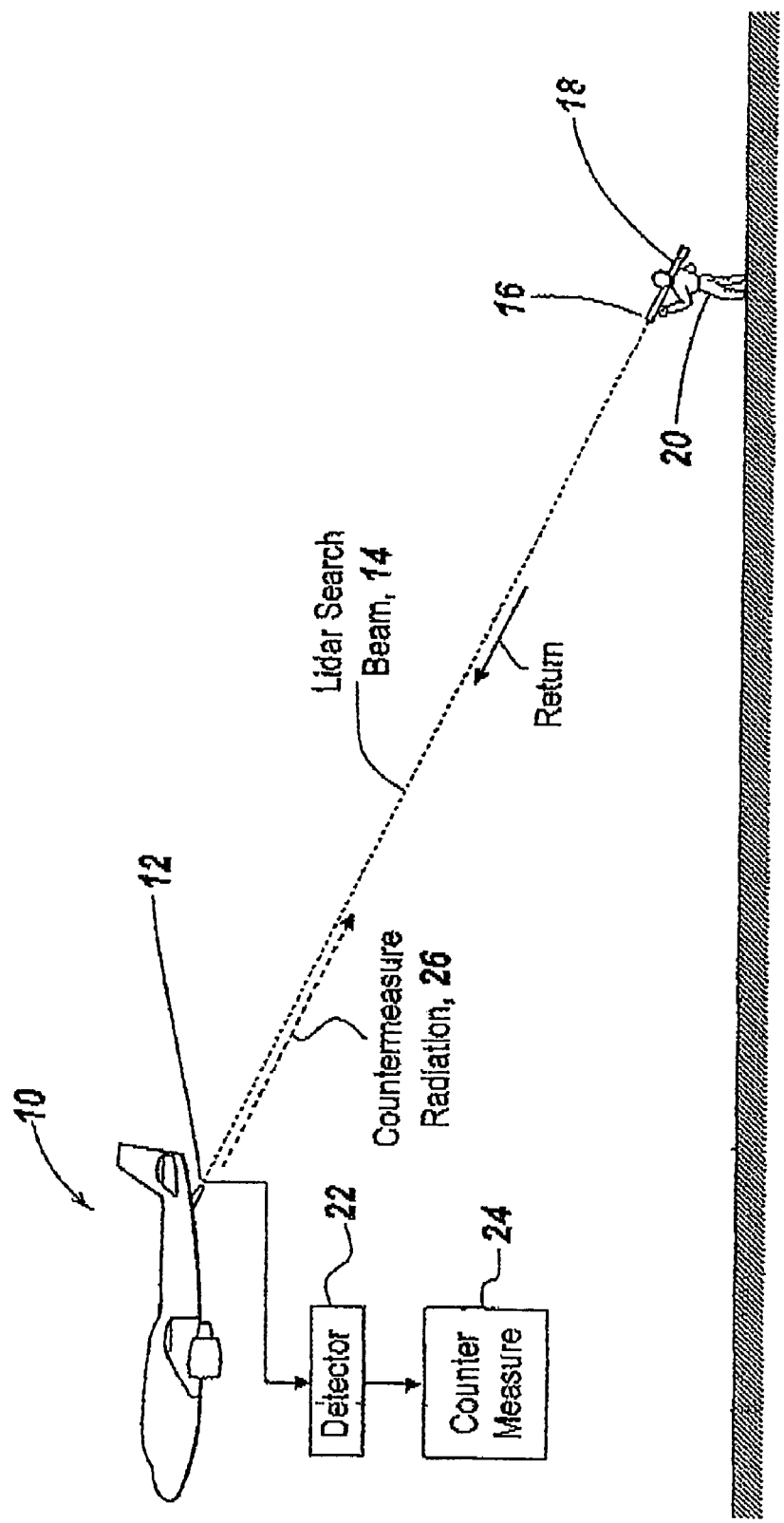
FIG. 1 is a diagrammatic representation of the use of a LIDAR system to detect the seeker of a shoulder-fired missile and to employ countermeasure radiation to spoof the guidance system of the missile.

Referring now to FIG. 1, an aircraft 10 carries a LIDAR unit 12 that includes a search laser to scan the ground with a laser beam 14. The laser beam is to operate in the eye-safe region, especially when the LIDAR unit is utilized in populated areas.

It is the purpose of the search laser beam to detect the presence of a seeker 16 at the head of a shoulder-launched missile 18 carried by an individual 20 such that the presence of the seeker is detected even before the missile leaves its launcher.

In order to do this, a detector, generally illustrated at 22, is utilized, with the output thereof driving a countermeasure unit 24 to transmit countermeasure radiation 26 directly back along the boresight line of the search beam when an event is determined to have occurred. This event is the return of the reflected light back along the path of the search beam, with the light illuminating the seeker being reflected by seeker optics and other elements within the seeker back along the same direction as the incoming light beam.

It will be appreciated that seekers in general are utilized to scan a given area to search for thermal energy from an aircraft and more particularly the aircraft engines. The amount of light returned by the seeker is such that, when the seeker has its optics directly trained on the heat source engine, search laser illumination is reflected by the seeker's optics back along the illuminating beam. While the seeker is not necessarily a retro-reflective optical element, it functions to return a good portion of the illuminating radiation back towards the source of the illumination when the seeker is pointed at the source of the illumination.

As mentioned hereinbefore, this happens only perhaps 1% of the time, making the identification of a missile seeker in this manner somewhat difficult and usually requiring the existence of a high-power kilowatt search laser.

Figure 2:
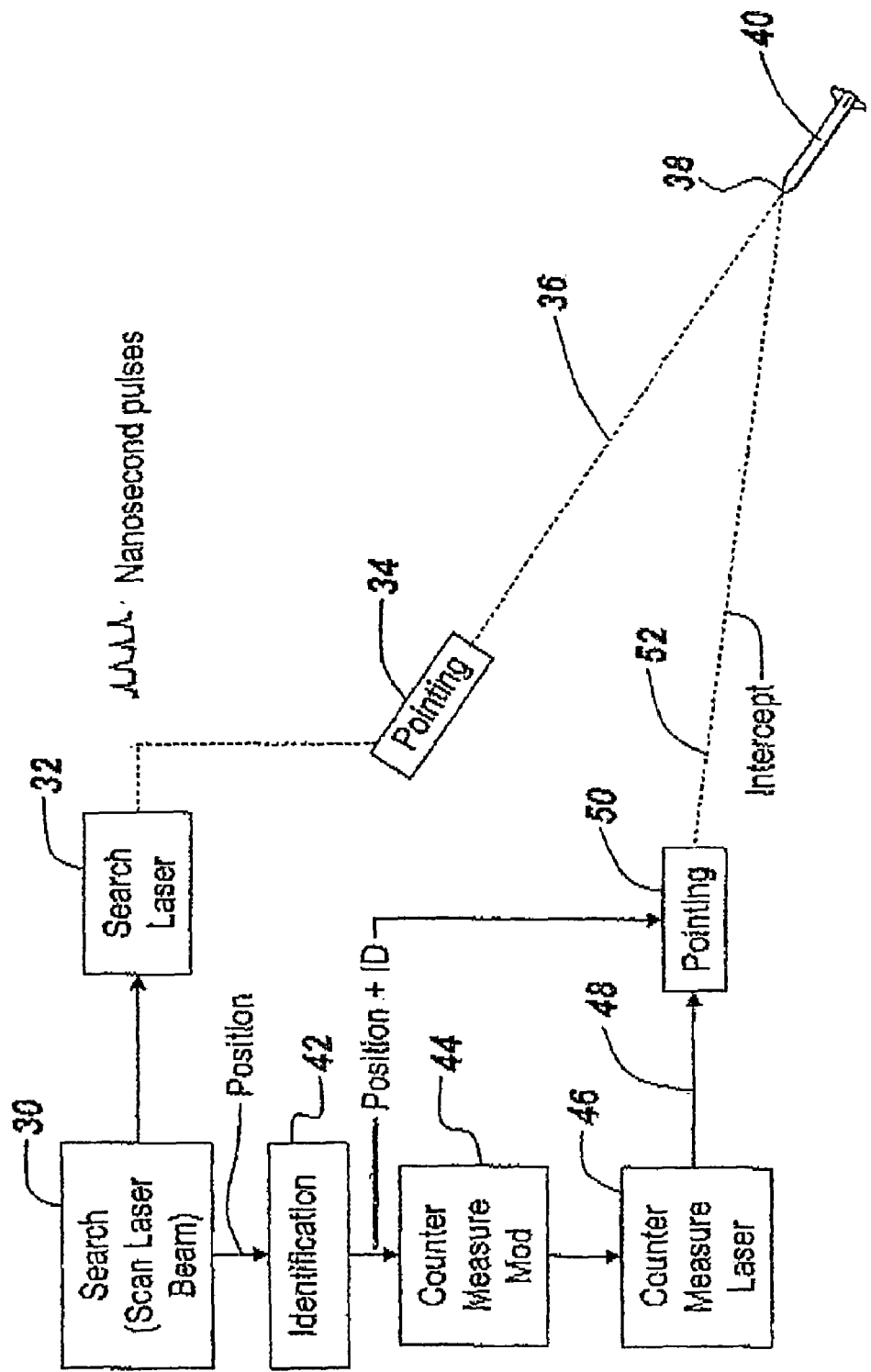
FIG. 2 is a block diagram of a method for countermeasuring the shoulder-launched missile of FIG. 1, indicating the utilization of a search step involving a scanning laser beam which involves transmission of nanosecond pulses so as to provide an indication of the position of the seeker and identification of the returns from the search laser.

Referring to FIG. 2, in general the LIDAR system includes a search phase 30 in which a search laser 32 is scanned by a pointing system 34 in a direction to cover the surface of the earth underneath the aircraft, either before or after the aircraft.

The search laser provides an illuminating beam 36 towards seeker 38 of missile 40 which, when a return from the seeker is sensed and a return is identified as illustrated at 42, the position and the identification activates a countermeasure module 44 to activate a countermeasure laser 46 to provide a modulated output 48 to a pointing device 50 which is aligned with pointing device 34 so that countermeasure radiation is transmitted along an intercept line 52 and is made to impinge on seeker 38.

As mentioned hereinbefore, the problem with such a system is that returns from the ground are smeared out so that the returns from the seeker are buried in the diffuse returns from the ground. This is true regardless of laser power, i.e., more power cannot in itself distinguish a crisp threat return from a diffuse one.

As mentioned before, range gating methods have been utilized to try to distinguish the ground from the seeker, but because the returned pulses are relatively long and because of the slowness of the detection system, range-gated determination is not useful in discriminating ground clutter from an actual target.

Figure 3:
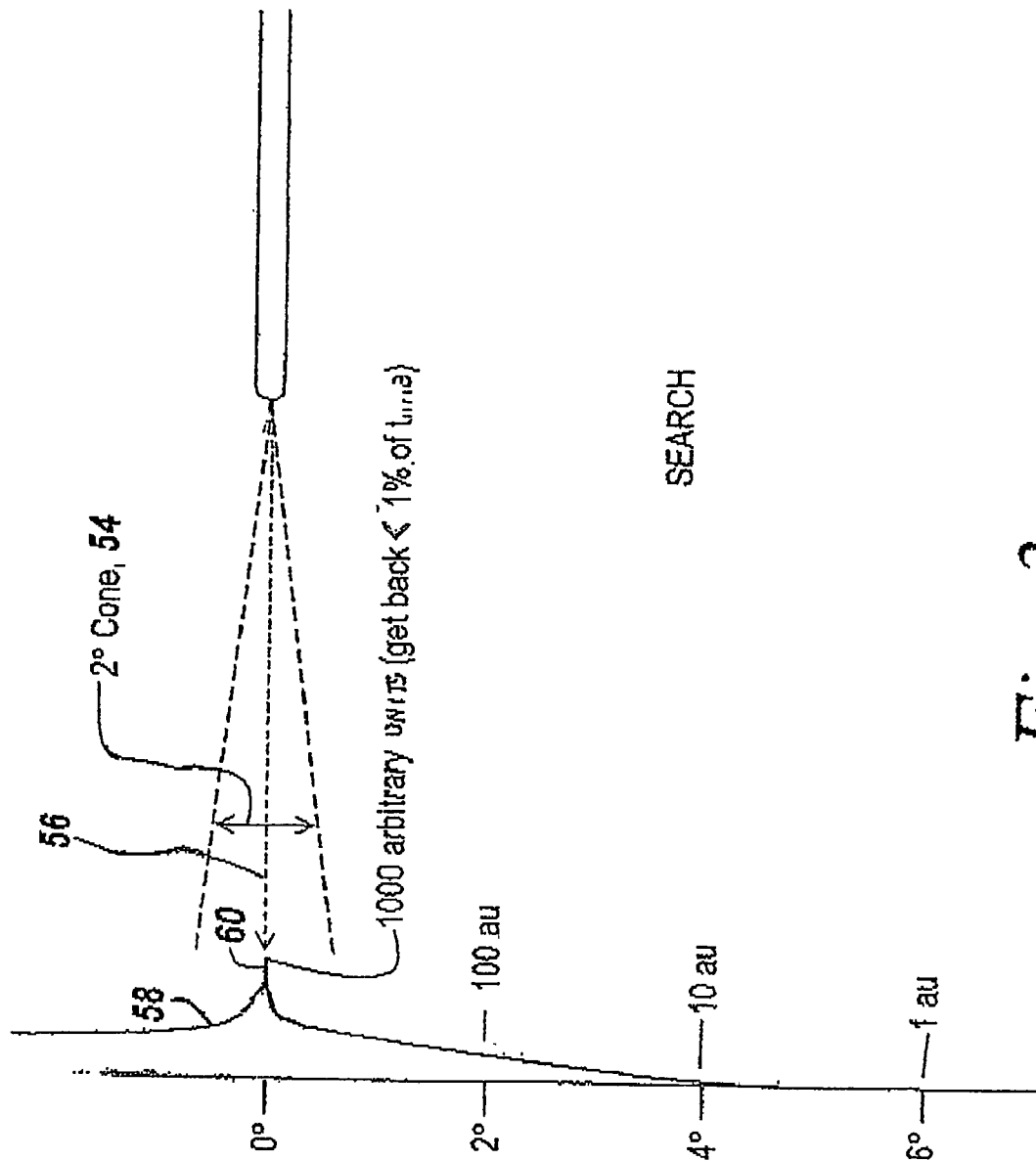
FIG. 3 is a diagrammatic representation of the strength of returns from the seeker of a missile either on-axis, or at two degrees, four degrees and six degrees off-axis, indicating that even on-axis one obtains returns back to the illuminating laser only 1% of the time.

Referring to FIG. 3, in order to indicate the difficulty of discerning a direct return from a seeker, it can be seen that the beam from the seeker usually has a two-degree cone, here illustrated at 54. Assuming that, at some instant of time, the seeker is looking directly at the LIDAR interrogating laser, and assuming that it is pointed along a center line 56 denoted by zero degrees, then the detected amplitude 58 peaks, for instance, at 1000 au or arbitrary units. It has been found in practice that one gets such a peak return from a seeker only 1% of the time so that looking for peak 60 which requires a direct look of the seeker back at the LIDAR, is a relatively useless way of identifying the presence of a seeker.

As can be seen, at two degrees off-axis, a 1,000-au signal from the seeker might be reduced to a 100-au signal, which at four degrees off axis is a 10-au signal and which, at six degrees off-axis, is a 1 au signal. Thus the 1% probability at zero degrees rapidly degrades when the seeker is directly slightly away from the LIDAR.

What will be appreciated is that if one is not looking at the direct on-axis return from the seeker in order to establish the presence of the seeker, one is dealing with signals which are down either an order of magnitude or two orders of magnitude, or three orders of magnitude from an on-axis signal. Thus, what can be deduced is that if there is only a 1% probability for the direct on-axis case, the probability of detection at two degrees, four degrees and six degrees off-axis is exceedingly low if one is to be looking for slightly off-axis returns from the missile seeker.

Figure 4:
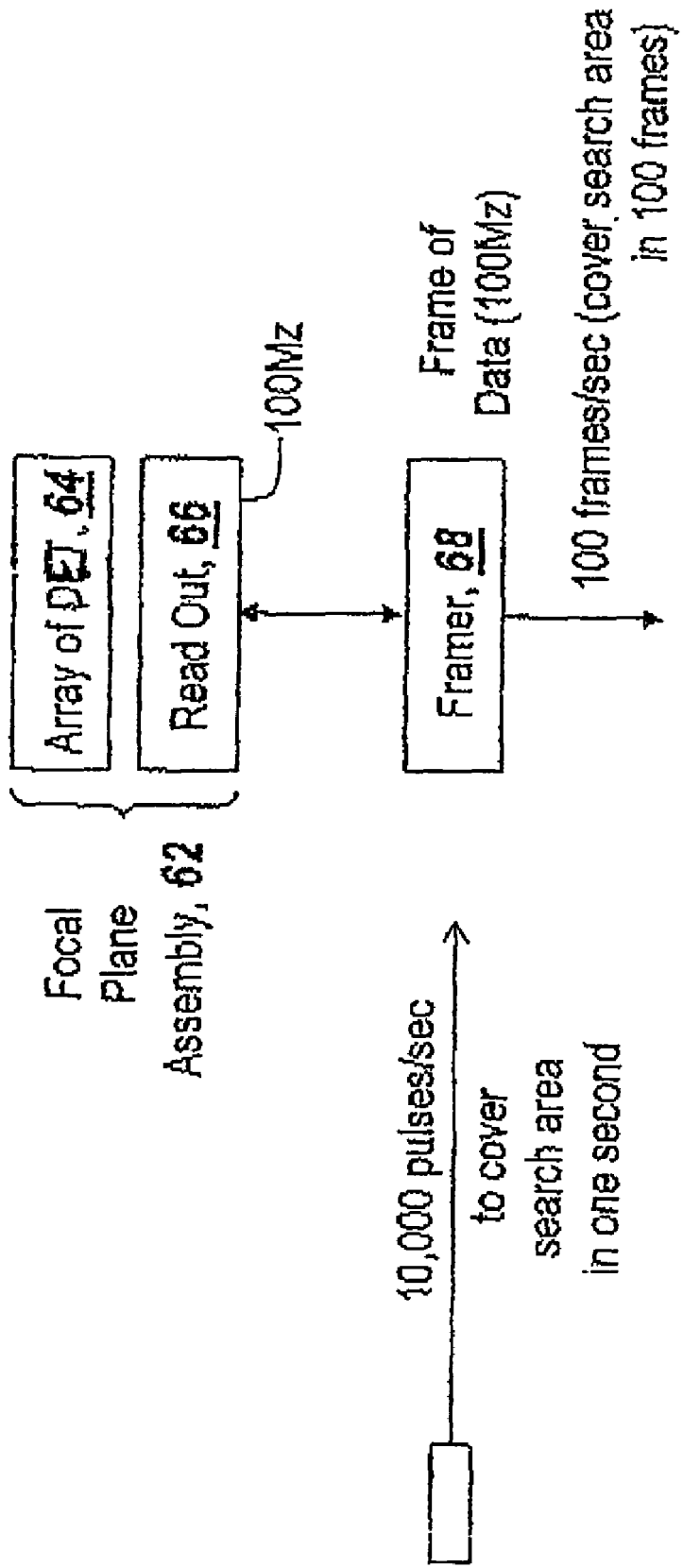
FIG. 4 is a block diagram showing a conventional focal plane assembly, which includes an array of detectors and a readout section operating at 100 looks/sec. or 100 Hz, with the output of the readout section applied to a framer that collects frames of data at 100 frames per second such that the search area is covered in 100 frames.

In the past, and referring now to FIG. 4, in order to detect returns from a LIDAR system, a focal plane array 62 including an array of detectors 64 and an integrated circuit readout 66 is utilized to determine the position of the seeker. In the past, the readout integrated circuit, which may be integral to the array, is strobed at 100 Hz, meaning that the array has 100 looks per second in order to establish the presence of a seeker aimed at the LIDAR unit. The output of the readout integrated circuit is applied to a framer 68, which collects a frame of data, again at 100 frames per second, with a frame correlated to a given search area on the ground. At 100 frames per second, the framer covers the search area in 100 frames if it is to revisit the threat volume once per second.

In order to be able to differentiate a target from the rather stretched-out returns from sand, rocks or the like, it is desirable to illuminate the ground with 10,000 pulses per second, which means that 10,000 pulses are utilized to cover the search area in one second. In order to do so, one needs one-nanosecond pulses from the search laser. However, since the prior readout devices operated at 100 Hz, they were incapable of distinguishing individual ones of the 10,000 pulses per second.

Figure 5:
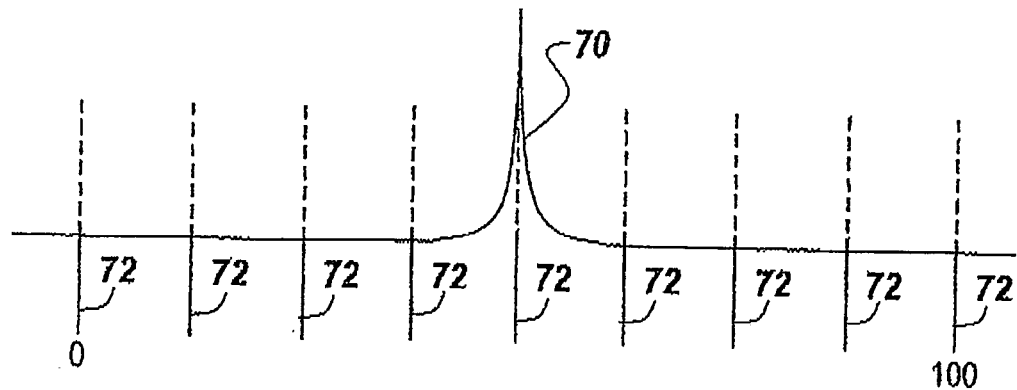
FIG. 5 is a graph showing that in 100 looks one may have a high peak return from a seeker versus the returns from smaller cross-section targets such as ground clutter.

Referring to FIG. 5, what is depicted is a graph showing the amplitude of returns from the ground in which, for 100 tries, one might obtain a high-peak pulse return 70. However, there will be returns from smaller cross-section targets, such as the ground, anywhere from the first try to the 100th try, as illustrated by lines 72.

Since the high peak pulse 70 rarely occurs, the desired operation is not to look for the large-peak pulse but rather to look for smaller cross-section off-axis pulses from a seeker which occur more frequently than does the large-peak pulse which is the result of the seeker directly aimed at the LIDAR. One therefore needs to be able to ascertain returns from the seeker which are off-axis and therefore are of smaller cross-section.

Figure 6:
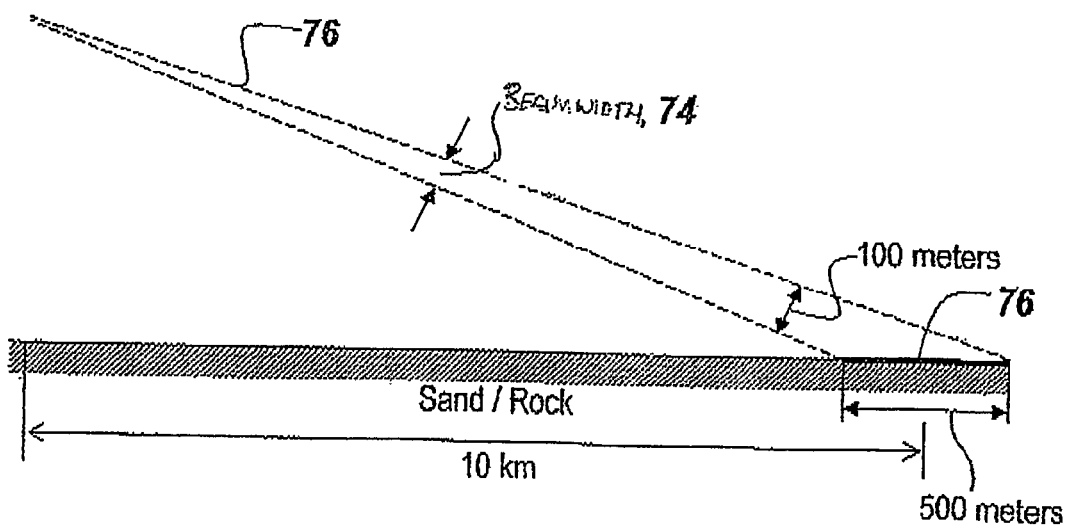
FIG. 6 is a diagrammatic illustration of the illumination of the surface of the earth at 10 kilometers from a LIDAR source, with the search beam having a 10 milliradian beam width corresponding to a 100-meter cross-section at 10 kilometers, with the surface of the earth returning radiation back to the search laser from the 500 meter ground footprint.

Referring to FIG. 6, assuming even that one could have a detector that could detect the lower cross-section returns from a target, this immediately calls into question how to deal with the low cross-section returns from the ground which might be confused with returns from the seekers. In FIG. 6, assuming a 10-milliradian beam width 74 of a LIDAR beam 76, the cross-section at ten kilometers is 100 meters, which on the surface of the earth translates to approximately 500 meters of illuminated territory, as illustrated at 76. What will be seen is that the returns from all of the particles in the ground over 500 meters constitute an elongated return pulse or a return pulse that appears smeared out. Even with a low ground return cross-section the illuminated area is large enough that if integrated it could exceed a target return, making a false event.

Figure 7:
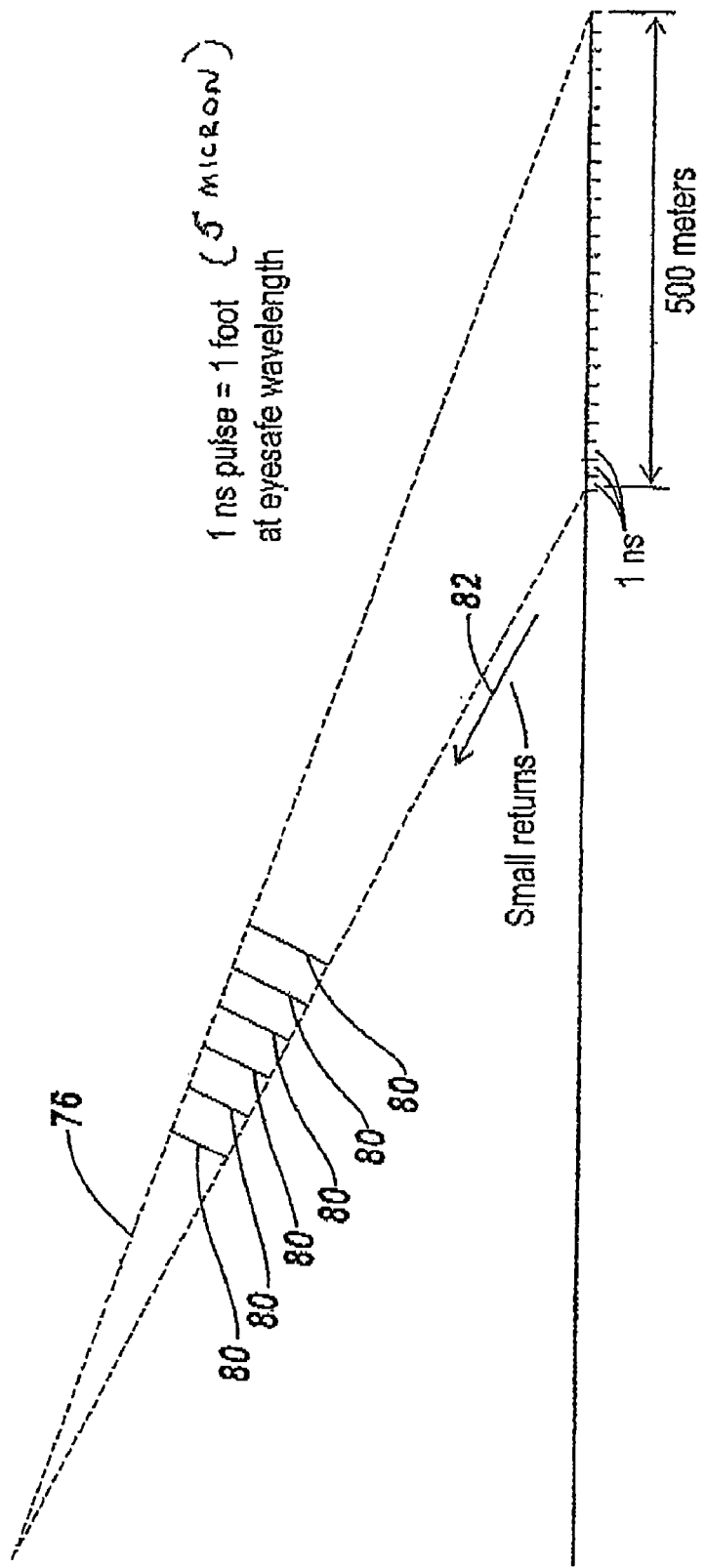
FIG. 7 is a diagrammatic illustration of the interrogation by the search laser with nanosecond laser pulses corresponding to one-foot intervals, thus to divide up the 500-meter footprint of the search laser into one-foot segments.

Ground returns are spread as indicated in FIG. 7. Thus the ability to distinguish short from long pulse returns suppresses ground returns.

Referring now to FIG. 7, if an eye-safe laser were to project ultra-short nanosecond pulses 80, then from a range gating point of view, the 500-meter illuminated area 76 on the surface of the earth would be divided up into little range chunks one foot in width. Assuming that one had a detector which could, rather than integrating the returns from the surface of the earth, directly measure them, then one could potentially discriminate against earth returns which are spread out versus returns from a seeker which occur only at one time. Note that as is illustrated by arrow 82, the returns from the earth would be small cross-section returns.

It is noted that the amount of light that actually comes back regardless of angle is referred to the bidirectional reflectance distribution function or BRDF. By making the pulses extremely short, a detector that can recognize these distinguishes a threat return from an extended set of ground returns for two reasons (1) its aperture is nearly aligned to the beam, and (2) even off-axis the optics redirect the return to the source.

Figure 8:
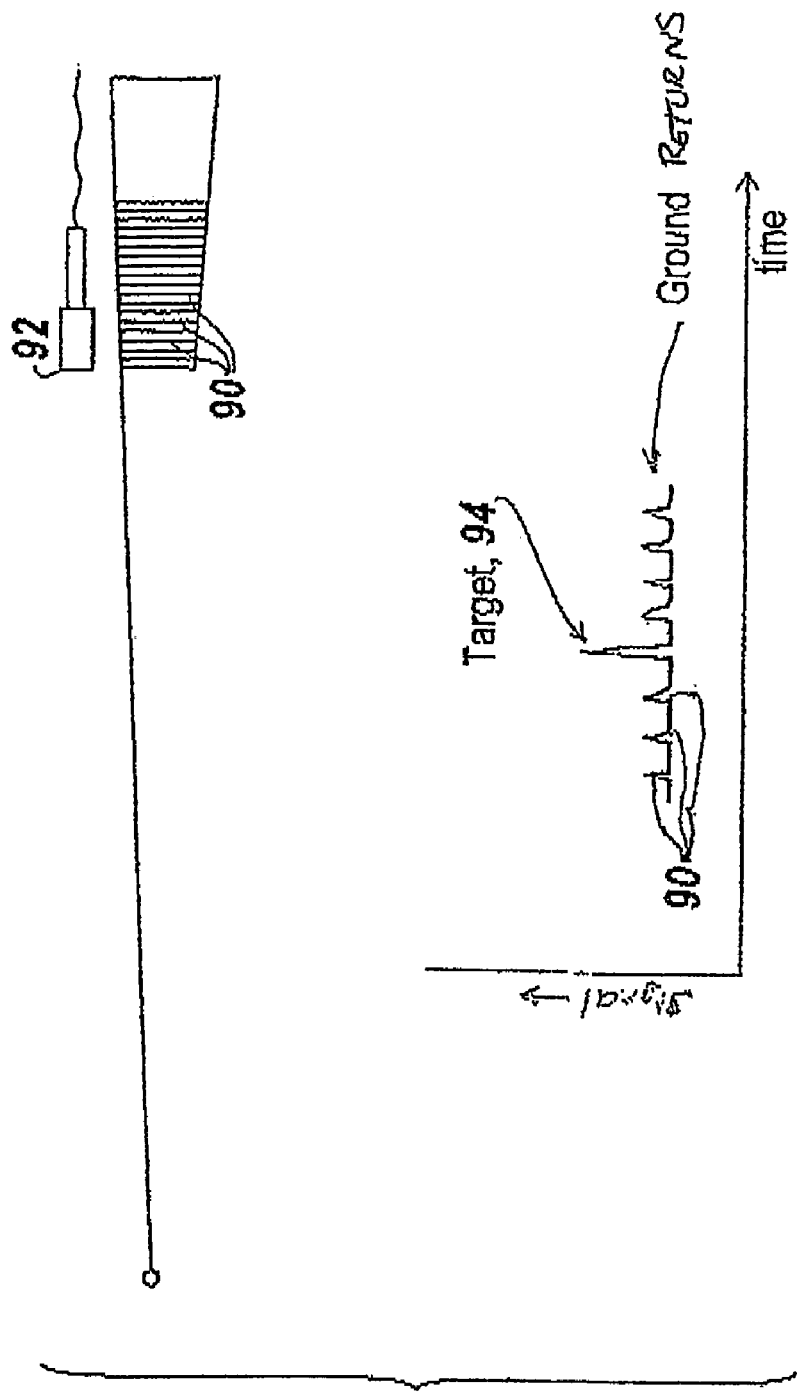
FIG. 8 is a diagrammatic illustration of a top view of the illuminated surface of the earth with one-foot intervals, also showing a target return at, for instance, the first range, with the other ranges having lower cross-section returns at the remaining one-foot intervals.

Referring to FIG. 8, a top view of the scenario in FIG. 7 is illustrated in which the ground is illuminated by a number of lines 90 corresponding to the one-foot interval between the one-nanosecond pulses. The result, assuming a seeker 92 is at the position shown, is that there is a return from the seeker, as illustrated 94 on the graph below, whereas the returns from the ground are illustrated at 96. What will be seen is that, from a pulse, the target return will be high but brief, whereas there will be many ground returns from the area in front of and behind the actual target which will be small. A short pulse discriminating detector therefore can recognize as an event only a single return in a frame versus the many returns from ground clutter.

Figure 9:
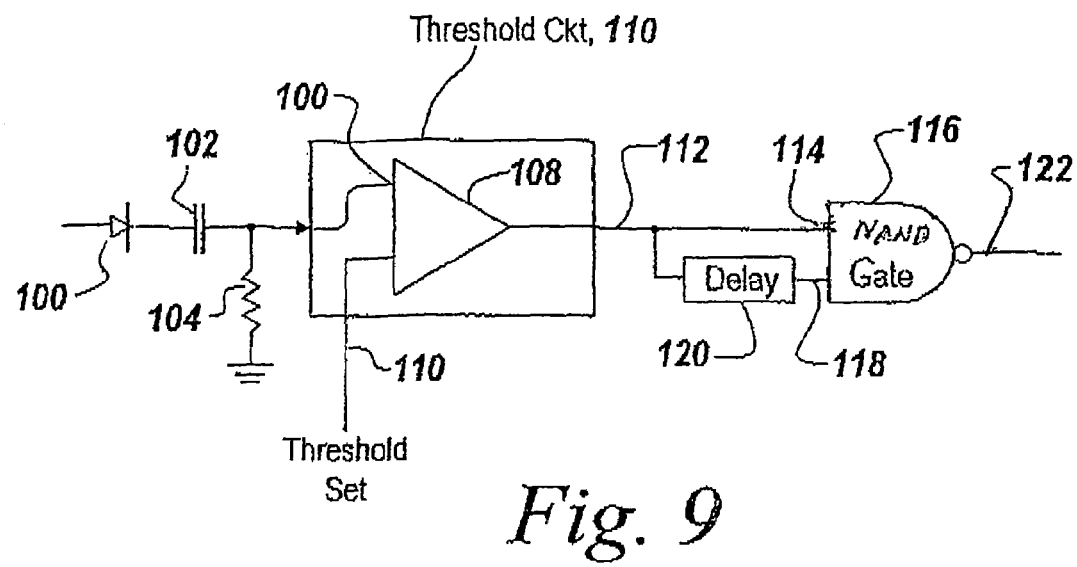
FIG. 9 is a schematic diagram of one element in a focal plane array which includes a detector, an RC coupling network to a threshold circuit, also showing a comparator for setting the threshold, the output of which is optionally coupled to a NAND gate input terminal having another of its input terminals provided with a one-nanosecond delay output from the threshold circuit, thus to provide discrimination.

In order to be able to discriminate such short return from such short pulses and do so in a timely fashion, each of the elements of the array as illustrated in FIG. 9 includes a photodiode 100 an RC circuit 102 and 104 coupled to an input 106 of a differential amplifier 108, which serves as a thresholding circuit 110. The threshold for which an output pulse is provided from the threshold circuit is set by a signal on line 110. Here the output at 112 indicates that an event has occurred, meaning photons have reached the photo detector at such a high intensity as set by the threshold that an event can be reliably said to have occurred. With the threshold set relatively high, ground returns are rejected. Moreover, while an RC circuit might be utilized at the output of threshold circuit 110 in order to filter out long-lasting returns from a stretched-out pulse due to ground clutter, in a preferred embodiment, the output of threshold circuit 110 is coupled to one input 114 of a NAND gate 116, having as its other input a delayed signal 118 provided by delay circuit 120, which delays the output signal 112 from threshold circuit 110 by, for instance, one nanosecond.

The result is that the particular pixel element in the array will only output a signal 122 when there is radiation on the detector 100 that exists for no more than one nanosecond or whatever the probe pulse length is. If it does, then there will be a signal on input 118 of NAND gate 116 which will prevent the generation of pulse 122. Note that optical aberrations in the target lengthen the pulse but only by a few picoseconds typically.

Figure 10:
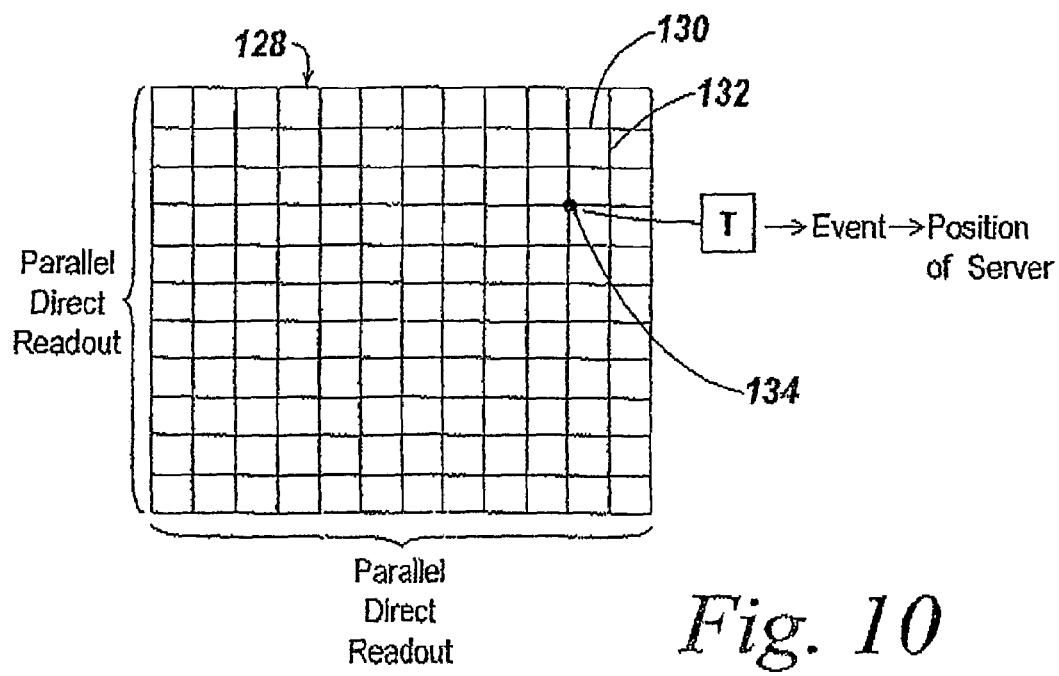
FIG. 10 is a diagrammatic illustration of a detector array having its rows and columns read out in parallel in a direct readout system in which an event is noted when there is an output from a threshold circuit, with the cross point at the detector indicating the position of the illuminated missile seeker; and, FIG. 11 is a diagrammatic illustration of one of the elements in the array of FIG. 10, illustrating that the element may be addressed by rows and columns, either synchronously or asynchronously probed by DEMUX units sufficiently fast that all of the elements of the array in FIG. 10 are read out within one DEMUX cycle, thus to establish the presence of a return from a target whose return is above the threshold level, the rest of the array returning zero signals.

As seen in FIG. 10, an array 128 of such detectors is addressed by rows and columns, respectively 130 and 132, with the cross points of the array being read out in parallel by a direct readout system. Here in FIG. 10, an event 134 is indicated at a particular point on the array when the threshold 136 has been exceeded.

As can be seen, an event occurs at array 128 when a threshold has been exceeded. It has been found that, in one scenario, during any one frame in which, for all of the 500-by-500 detectors in the array are read out, only one element will be indicated as having had an event. Thus, while the array may be read out virtually simultaneously for all pixels, at any given time there will only be one event indicated. This means that one can use a direct readout of all elements of the array and detect even a low cross-section target.

Thus, rather than sampling and storing all of the pixels on the array, the array can be read out directly, with all pixels of the array being read out in parallel.

The likelihood that more than one crossover point of the array will indicate a target detected can be made exceedingly low whilst still using low probe laser power and having a high detection probability. Thus, the probability that an indication from a particular threshold circuit is valid is close to 99%.

Figure 11:
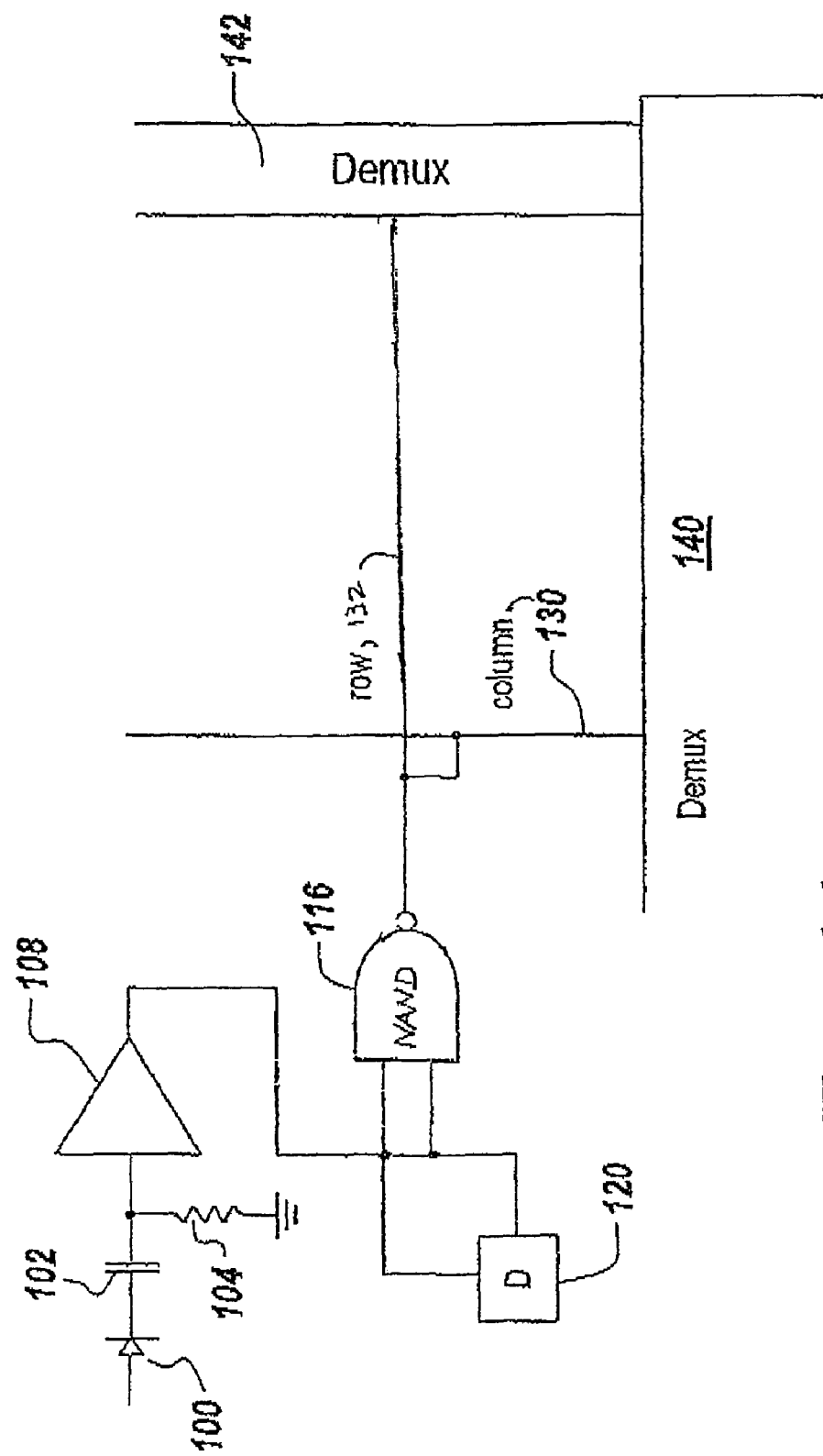

More particularly, referring to FIG. 11, since the output of a particular NAND gate is addressable by a particular row and column, demultiplexing units 140 and 142 are utilized either asynchronously or synchronously to read out all of the pixels of the array grid. This can be done virtually simultaneously in view of standard demultiplexers available operating into the one- to two-gigahertz range. What this means is that all of the pixels of an array can be directly read out by conventional demultiplexers in a time period less than the one-nanosecond pulse spacing.

It will be appreciated that, for a 500-by-500 array grid, if the focusing on the focal plane array is not sharp enough, a return may actually be focused on two or three adjacent pixels.

It is a relatively simple matter to provide an AND gate structure in the demultiplexer so that, if there are occurrences at adjacent detectors, they will be interpreted as being a single event.

More particularly, in one configuration each pixel requires a single access line for a row and column. Levels can be written to the settable comparator level. Threshold crossings set a register, which in turn puts a signal on the address lines, which are now output lines. The two-way capability of the address lines is not essential as the levels can also be set by such techniques as laser scribing a resistive divider to establish the comparison for each pixel.

The output lines are then sampled in such a way as to detect singlets, doublets, and triplets in any combination on two dimensions, for example a 1×1, a 2×3 or a 2×2.

The reason for allowing detection of doublets and triplets is to allow for the type of events that can trigger several contiguous pixels. These are the arrival of a return at the intersection of two or four pixels which cause a significant overload. In case of overload, a signal will reach threshold in adjoining pixels. When used with an optic matched to the array the presence of a triplet will indicate overload and therefore effectively extend the single frame dynamic range of the array.

Although singlet, doublet and triplet detection has been discussed, the number is not inherently limited except by read speed and ability of the pixel register to drive the demultiplexers and arrays of AND gates.

Similarly, there is no reason to limit detection to a single contiguous group of pixels if there is room on the readout chip. Moreover, too many options will reduce readout speed. As the device becomes faster the likelihood of more than a single pixel group triggering in a single gate time becomes very small. This approach also allows the detection of numerous targets with a single laser pulse. So long as the targets are at ranges far apart to prevent read interference they can be detected if the reset time were 10 nanoseconds, this range separation would be about 5 feet. Thus the search can be conducted with as few as one probe pulse per element of search area. The benefit of this invention is that it can find closely spaced targets with high resolution with a single pulse. If these were 100 meters apart they would be separated by 0.7 microseconds (700 nanoseconds). A conventional gated imager would require a gate this long to see them and not be able to distinguish between these targets and the accumulated returns along this 100 meters.

When the fastest pulses are used the range separation can be reduced to that of 0.1 nanosecond or about ¾ of an inch. This separation prevents use of multiple reflectors hiding the real target. This discrimination limit is determined only by the speed of the laser pulse, the amplifier and the digital logic. This is a significant advantage over trying to achieve the gain on the pixel by the "Geiger mode." In Geiger mode the detector breaks non-linear producing tremendous gain. The cost is that the fired pixel has to be reset and held off until it has recovered from the event.

One essential element of the subject invention is that the threshold is set so high that even a single accidental event indication due to comparator/amplifier noise or dark signal fluctuation threshold crossing on the array during a sample is unlikely. Furthermore, the sampling rate is set high enough that naturally occurring radiation is also unlikely to reach threshold. This combination of low noise event probability and very short sampling time also makes simultaneous events unlikely in separate groups of pixels. The short time translates to short-range bins due to the finite speed of light.

The primary event likely to cause a threshold crossing is a short laser pulse return from a compact target. A compact target is one that returns a large amount of the signal without significantly stretching the pulse. A retro return from an optical sensor is a good example.

The "gate" time is sufficiently short that this device discriminates against extended bright returns. For example a one-nanosecond sampling time has a two-way length of 15 cm or about 6 inches.

These types of focal plane arrays will not be paralyzed by a large number of such targets. Since its gate time is of the order of a nanosecond, the targets would have to be within this range tolerance to occur together.

Because only a few pixels, and these in a contiguous group, will ever have a return, reading only these pixels constitutes readout of the entire array. Note that the subject array supports a frame rate that can be as fast as the time to read the row and column registers.

Those skilled in the art will appreciate that this array does not provide intensity data, only threshold crossings although some intensity information can be inferred from the occurrence of doublets and triplets. This is what would be done in most RADAR based detection/acquisition sensors. The benefit is a frame rate no longer limited by the need to read the entire array but rather to read a few registers. This approach produces a readout rate several orders of magnitude faster than the current state of the art.

Furthermore, laser returns from compact sources are highly "scintillated," an effect that produces many orders of magnitude variation over even short ranges. This effect reduces the value of intensity data for ensembles of less than a few hundred samples to nil.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for ignoring ground clutter in determining the presence of a missile seeker that retro-reflects incident light, comprising the steps of:
projecting an ultrashort laser pulse having a predetermined nanosecond pulse width towards a search area to illuminate the retro-reflector of a seeker;
detecting only returns from the search area having the same pulse width as the projected pulses so as to detect retro-reflective returns from the seeker and so as to reject pulse-stretched returns, the detecting step including using a focal plane array having a direct-reading focal plane array of photo detectors, each of the photo detectors having a threshold circuit coupled to the output thereof and set high enough to ignore low-level non-retro-reflected returns from the terrain illuminated by the laser; directly and simultaneously reading out each of the photo detectors for direct event detection of retro-reflected energy characterized by pulse widths virtually identical to the pulse width of the projected pulses, the readout being in a time short enough to obtain a reading from each of the photo detectors before the arrival of the next pulsed return, the time defining a frame; and without post-processing, determining from the readout that there is a retro-reflected return from a missile seeker and the position thereof if there is a signal from a single threshold circuit during the frame and if the signal from the single threshold circuit is not longer than the pulse width of the projected ultrashort pulse such that pulse width thresholding selects retro-reflected returns and ignores elongated returns from the illuminated terrain.

2. The method of claim 1, wherein the determining step includes providing a NAND gate having one input thereto coupled to the output of the threshold circuit and the other input thereto coupled to a delayed version of the output of the threshold circuit.

3. The method of claim 1, wherein compact targets are discriminated from ground returns by ascertaining if during a frame there are only a small predetermined number of outputs from the threshold circuit.

4. A detector element in a focal plane array used in a laser range finder or LIDAR system that projects a pulse towards a retro-reflecting target, the pulse having a predetermined nanosecond pulse width, said detector element responding only to retro-reflected energy in which the retro-reflected return pulse width is substantially equal to the width of the projected pulse, and thus to ignore ground clutter returns, comprising:
- a photo detector;
- a threshold circuit coupled to said photo detector; and,
- a filter coupled to said threshold circuit for ignoring an output from said photo detector exceeding the predetermined nanosecond pulse width of the projected pulse, thereby to selectively detect only returns from said retro-reflecting target.

5. The detector element of claim 4, wherein said filter includes an RC circuit set to filter out outputs from said threshold circuit that persist longer than said predetermined nanosecond pulse width time duration.

6. The detector element of claim 4, wherein said filter includes a NAND gate having one input thereto coupled to the output of said threshold circuit and a delay circuit coupled between the output of said threshold circuit and the other of the inputs to said NAND gate.

7. The detector element of claim 6, wherein said delay circuit delays the output of said threshold detector in the nanosecond range.

8. A focal plane array architecture for use with a pulsed laser generating pulses having a predetermined nanosecond pulse width to detect only retro-reflected returns from a missile seeker, comprising:
- a photon detector and a threshold circuit for each pixel of said array for increasing the feasibility of photon counting at infrared wavelengths;
- an ultra fast frame readout for said array utilizing direct simultaneous pixel readout;
- means coupled to said frame readout for inherent discrimination of retro-reflecting targets by ignoring ground returns, said inherent discrimination means including a filter for ignoring returns that persist beyond the predetermined nanosecond pulse width of the pulses from said laser; and,
- means coupled to said means for inherent discrimination for programmable range gating.

* * * * *